United States Patent
DeJager

[11] 3,912,379
[45] Oct. 14, 1975

[54] THREE ELEMENT OBJECTIVE LENS HAVING ASPHERIC SURFACES ON THE MIDDLE ELEMENT

[75] Inventor: Donald DeJager, Rochester, N.Y.

[73] Assignee: Eastman Kodak Company, Rochester, N.Y.

[22] Filed: Nov. 5, 1974

[21] Appl. No.: 521,226

[52] U.S. Cl.......... 350/226; 350/175 NG; 350/189; 350/206
[51] Int. Cl.².. G02B 3/04; G02B 9/16; G02B 13/18
[58] Field of Search............. 350/226, 189, 175 NG

[56] References Cited
UNITED STATES PATENTS

| | | |
|---|---|---|
| 3,194,116 | 7/1965 | Altman ................................ 350/226 |
| 3,438,697 | 4/1969 | Melech ................................ 350/226 |
| 3,449,041 | 6/1969 | DeJager ............................... 350/226 |
| 3,762,801 | 10/1973 | Baker .................................. 350/189 |
| 3,868,173 | 2/1975 | Miles et al. ..................... 350/189 X |

*Primary Examiner*—John K. Corbin
*Attorney, Agent, or Firm*—J. Morrow

[57] ABSTRACT

A three element objective lens having a front positive biconvex element, a middle negative biconcave element and a rear positive biconvex element. The first and second elements are formed of inexpensive plastic materials. Improved optical quality at a relative aperture of $f/4.00$ is achieved by the incorporation of an asphere on both surfaces of the middle negative element.

3 Claims, 1 Drawing Figure

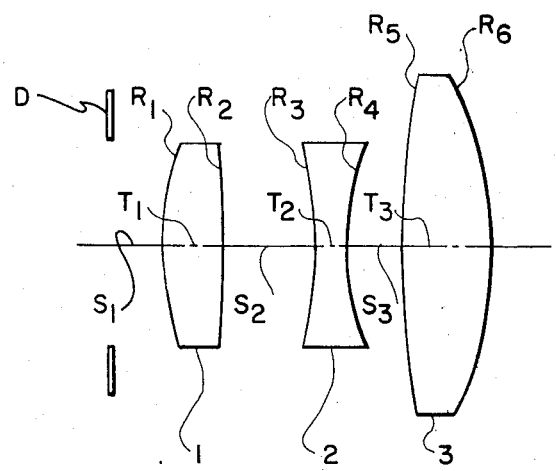

THREE ELEMENT OBJECTIVE LENS HAVING ASPHORIC SURFACES ON THE MIDDLE ELEMENT

BACKGROUND OF THE INVENTION

1. Field of the Invention

The present invention relates to photographic objectives and in particular to such an objective that comprises three air spaced elements.

2. Description of the Prior Art

Triplets for use as photographic objectives are well known. Initially, such triplets were all glass, but later plastic materials were developed for use as lens elements, such as in U.S. Pat. Nos. 3,194,116; 3,438,697 and 3,449,041. Plastic materials have, in general, reduced the cost of photographic objectives but have accentuated certain design problems. For instance, variations in the back focal length due to thermally induced contraction and expansion of the optics may be increased.

SUMMARY OF THE INVENTION

In accordance with the present invention, there is provided a three element objective lens comprising a front positive biconvex element, a middle negative biconcave element and a rear positive biconvex element. The first and second elements are made of inexpensive plastic materials. Good optical performance at a relative aperture of $f/4.0$ is achieved by incorporation of aspheres on both of the surfaces of the middle negative element.

BRIEF DESCRIPTION OF THE DRAWING

In the detailed description of the preferred embodiments of the invention presented below, reference is made to the accompanying drawing which is a diagrammatic axial cross section of a lens according to the present invention.

DESCRIPTION OF THE PREFERRED EMBODIMENTS

For all purposes of describing or claiming of the invention, the term lens will be used to describe the complete lens and not the elements thereof. In the drawing, the elements are numbered from left to right with Arabic numerals. In each of the examples, the elements, indices of refraction, N, Abbé numbers V, radii of curvature R, thicknesses T, and air spaces S are numbered to correspond with the drawing. The indices of refraction are for the 0.5893 micron sodium D line of the spectrum. The Abbé numbers are calculated utilizing the D line index and, as the main dispersion, the index difference between the 0.4861 micron hydrogen F line and the 0.6563 micron hydrogen C line. Radii of curvature having centers of curvature to the right of the surface are considered positive; those with centers of curvature to the left of the surface are considered negative.

In all embodiments of the invention as illustrated in the drawing, the lens comprises three air spaced elements. Element 1 is a front positive biconvex element. Element 2 is a middle negative biconcave element. Element 3 is a rear positive biconvex element. D is a diaphragm.

The use of aspheric surfaces in a lens design provides additional parameters for correction of aberrations. Incorporation of an aspheric surface is particularly useful in a higher relative aperture lens, because it permits a better correction of spherical aberration than is otherwise obtainable. In the design of the present invention, the improved spherical aberration correction, along with the high relative aperture, are achieved by the use of aspheres on both surfaces of the middle negative element.

An aspheric surface may be described by the following equation:

$$x = \frac{Cy^2}{1 + \sqrt{1-(1+K)C^2y^2}}$$

This equation describes a surface in terms of its surface sag $x$ at a semi-aperture distance $y$ from the axis of the lens. The constant C is the vertex curvature, that is, the surface curvature at the vertex of the lens, equal to the reciprocal of the vertex radius of curvature R. The constant K is the conic constant. Certain values of K describe conic sections or surfaces of revolution about the optical axis of the lens. Higher order terms in the equation for $x$ may also be included, if desired.

Lenses may be made according to this invention by following the specifications in the preferred embodiments presented below;

EXAMPLE I

| Element | $N_D$ | V | Radius mm | Thickness/Separation |
|---|---|---|---|---|
| 1 | 1.49168 | 57.4 | $R_1$=9.4442 | $S_1$=1.500 |
| | | | $R_2$=−60.482 | $T_1$=2.100 |
| | | | | $S_2$=3.110 |
| 2 | 1.59028 | 30.9 | $R_3$=Asphere | $T_2$=1.000 |
| | | | $R_4$=Asphere | |
| | | | | $S_3$=1.810 |
| 3 | 1.73400 | 51.0 | $R_5$=29.491 | $T_3$=3.200 |
| | | | $R_6$=−11.878 | |

Example I illustrates a lens having a focal length of 25.00mm, with a relative aperture of $f/4.0$, and a semi-field angle of 23.11°. Elements 1 and 2 are made of polymethyl methacrylate and polystyrene respectively, while Element 3 is made of a higher index glass material. The choice of materials and the relative optical powers of Elements 1 and 2 are designed to compensate for the index change caused by thermal shifts, so that the back focal length of the lens is relatively insensitive to changes in temperature. This permits design of a lens having a higher relative aperture, even though the thermal effects on such lenses are accentuated by the decrease in depth of focus. The aspheres on the surfaces of Element 2 are an ellipsoid and a hyperboloid characterized by the following coefficients:

Table I

| Surface | C | K |
|---|---|---|
| 3 | −0.0900386 | 2.317611 |
| 4 | 0.1139004 | −1.869075 |

EXAMPLE II

| Element | $N_D$ | V | Radius mm | Thickness or Separation mm |
|---|---|---|---|---|
| 1 | 1.49168 | 57.4 | $R_1$=10.053 | $S_1$=1.500 |
| | | | | $T_1$=2.100 |

Table I-Continued

| Surface | C | K |
|---|---|---|
| 3 | −0.0900386 | 2.317611 |
| 4 | 0.1139004 | −1.869075 |

EXAMPLE II

| Element | $N_D$ | V | Radius mm | Thickness or Separation mm |
|---|---|---|---|---|
| | | | $R_1=-62.225$ | |
| | | | | $S_2=3.290$ |
| 2 | 1.59028 | 30.9 | $R_3$=Asphere | $T_2=1.000$ |
| | | | $R_4$=Asphere | |
| | | | | $S_3=1.790$ |
| | | | $R_5=31.668$ | |
| 3 | 1.73400 | 51.0 | | $T_3=3.260$ |
| | | | $R_6=-11.663$ | |

Example II illustrates a lens having a focal length of 25.76mm, with a relative aperture of $f/4.00$ and a semi-field angle of 22.52°. It is similar to Example I in the choice of materials, the relative optical powers, and in the incorporation of an ellipsoid and a hyperboloid surface on Element 2. The asphures are characterized by the following coefficients:

Table II

| Surface | C | K |
|---|---|---|
| 3 | −0.0913993 | 1.946468 |
| 4 | 0.1076960 | −1.988948 |

While there are many ways to judge the optical performance of a particular lens, one criteria is the image formed of a point object, with the size of the image taken as the diameter of the circle which contains 50 percent of the rays. Light rays of three different wavelengths, 0.44, 0.55 and 0.65 micron, were utilized in the relative ratio 15:50:35. Rays were traced at six different field angles through each lens. The parameters illustrated in Table III illustrate the results of these computations for the lenses of Examples I and II in comparison with lenses which are presently available. Sample 1 is an EKTAR four element lens made of glass with an effective focal length of 26mm and a relative aperture of $f/2.7$. Sample 2 is an EKTAR three element lens, made of plastic and glass, with an effective focal length of 26mm and a relative aperture of $f/5.6$.

Table III

| Lens | Axis | 40% | 60% | 75% | 90% | 100% |
|---|---|---|---|---|---|---|
| Example 1 (25.00mm, f/4.0) | 5.2 | 6.0 | 10.2 | 14.0 | 12.4 | 39.2 |
| Example 2 (25.76mm, f/4.0) | 5.0 | 7.4 | 9.6 | 12.2 | 12.2 | 43.8 |
| Sample 1 (26.00mm, f/2.7) | 7.6 | 8.2 | 9.0 | 9.2 | 13.0 | 25.8 |
| Sample 2 (26.00mm, f/5.6) | 5.6 | 10.8 | 12.5 | 9.8 | 12.8 | 37.8 |

By comparison of the spot diameters illustrated in Table III, it may be seen that the plastic-glass triplets utilizing aspheric surfaces on Element 2 are close in optical quality to lens samples 1 and 2. Note the improved optical performance near the axis, due to improved correction of spherical aberration. Also note that at 75% field, the optical quality of Examples 1 and 2 are slightly inferior to Samples 1 and 2. This is a result of astigmatism, related to the fact that the astigmatic node was shifted to the 90% field position, whereas in Sample lenses 1 and 2 the astigmatic node occurred at about 75% field. Consequently, Examples 1 and 2 are again close to lens Samples 1 and 2 in optical quality of 90% field.

The invention has been described in detail with particular reference to preferred embodiments thereof but it will be understood that variations and modifications can be effected within the spirit and scope of the invention.

I claim:

1. A three element lens comprising, from front to rear, a front biconvex positive element, a middle negative element and a rear positive biconvex element, wherein said middle negative element includes two aspheric surfaces and the lens has a focal length of F, within the range of 25mm ≤ F ≤ 26mm, when the radii of curvature R, thicknesses T, air spaces S, vertex curvatures C and conic constants K, as numbered by subscript from front to rear, are as defined by the following relationships:

$$9 \leq R_1 \leq 11$$
$$60 \leq -R_2 \leq 63$$
$$29 \leq R_5 \leq 32$$
$$11 \leq -R_6 \leq 12$$
$$T_1 = 2.1$$
$$T_2 = 1.0$$
$$3.2 \leq T_3 \leq 3.3$$
$$S_1 = 1.5$$
$$3.1 \leq S_2 \leq 3.3$$
$$1.7 \leq S_3 \leq 1.9$$
$$0.09 \leq -C_3 \leq 0.10$$
$$0.10 \leq C_4 \leq 0.12$$
$$1.9 \leq K_3 \leq 2.4$$
$$1.8 \leq -K_4 \leq 2.0.$$

2. A lens as in claim 1, wherein said lens has a focal length of 25.00mm when constructed according to the following parameters:

| Element | $N_D$ | V | Radius mm | Thickness/ Separation |
|---|---|---|---|---|
| | | | | $S_1=1.500$ |
| | | | $R_1=9.4442$ | |
| 1 | 1.49168 | 57.4 | | $T_1=2.100$ |
| | | | $R_2=-60.482$ | |
| | | | | $S_2=3.110$ |
| | | | $R_3$=Asphere | |
| 2 | 1.59028 | 30.9 | | $T_2=1.000$ |
| | | | $R_4$=Asphere | |
| | | | | $S_3=1.810$ |
| | | | $R_5=29.491$ | |
| 3 | 1.73400 | 51.0 | | $T_3=3.200$ |
| | | | $R_6=-11.878$ | | wherein, from front to rear, the elements are numbered from 1 to 3, the corresponding indices of refraction, N, and Abbé numbers, V, are listed for each element, the radii of curvature of the surfaces are numbered from $R_1$ to $R_6$, the thicknesses of the elements are numbered from $T_1$ to $T_3$, the spacings between the diaphragm and the elements are numbered from $S_1$ to $S_3$, and wherein $R_3$ and $R_4$ represent the radius of curvature at the vertex of an aspheric surface defined by the following formula and parameters:

$$x = \frac{Cy^2}{1 + \sqrt{1-(1+K)C^2y^2}}$$

-Continued

| Surface | C | K |
|---|---|---|
| 3 | −0.0900386 | 2.317611 |
| 4 | 0.1139004 | −1.869075 | wherein $x$ is the sag of an aspheric surface from a plane reference surface at a radial distance $y$ from the axis of the lens, C is equal to the reciprocal of the vertex radius of curvature R and K is the conic constant.

3. A lens as in claim 1, wherein said lens has a focal length of 25.76mm when constructed according to the following parameters:

| Element | $N_D$ | V | Radius mm | Thickness or Separation mm |
|---|---|---|---|---|
|  |  |  |  | $S_1$=1.500 |
|  |  |  | $R_1$=10.053 |  |
| 1 | 1.49168 | 57.4 |  | $T_1$=2.100 |
|  |  |  | $R_2$=−62.225 |  |
|  |  |  |  | $S_2$=3.290 |
|  |  |  | $R_3$=Asphere |  |
| 2 | 1.59028 | 30.9 |  | $T_2$=1.000 |
|  |  |  | $R_4$=Asphere |  |
|  |  |  |  | $S_3$=1.790 |
|  |  |  | $R_5$=31.668 |  |
| 3 | 1.73400 | 51.0 |  | $T_3$=3.260 |
|  |  |  | $R_6$=−11.663 |  | wherein, from front to rear, the elements are numbered from 1 to 3, the corresponding indices of refraction, N, and Abbé numbers, V, are listed for each element, the radii of curvature of the surfaces are numbered from $R_1$ to $R_6$, the thicknesses of the elements are numbered from $T_1$ to $T_3$, the spacings between the diaphragm and elements are numbered from $S_1$ to $S_3$, and wherein $R_3$ and $R_4$ represent the radius of curvature at the vertex of an aspheric surface defined by the following formula and parameters:

$$x = \frac{Cy^2}{1 + \sqrt{1-(1+K)C^2y^2}}$$

| Surface | C | K |
|---|---|---|
| 3 | −0.0913993 | 1.946468 |
| 4 | 0.1076960 | −1.988948 | wherein $x$ is the sag of an aspheric surface from a plane reference surface at a radial distance $y$ from the axis of the lens, C is equal to the reciprocal of the vertex radius of curvature R and K is the conic constant.

* * * * *